Aug. 8, 1950  J. M. McCORMICK  2,518,350
TESTING OF MATERIALS BY IMPACT
Filed Dec. 8, 1948  3 Sheets-Sheet 3
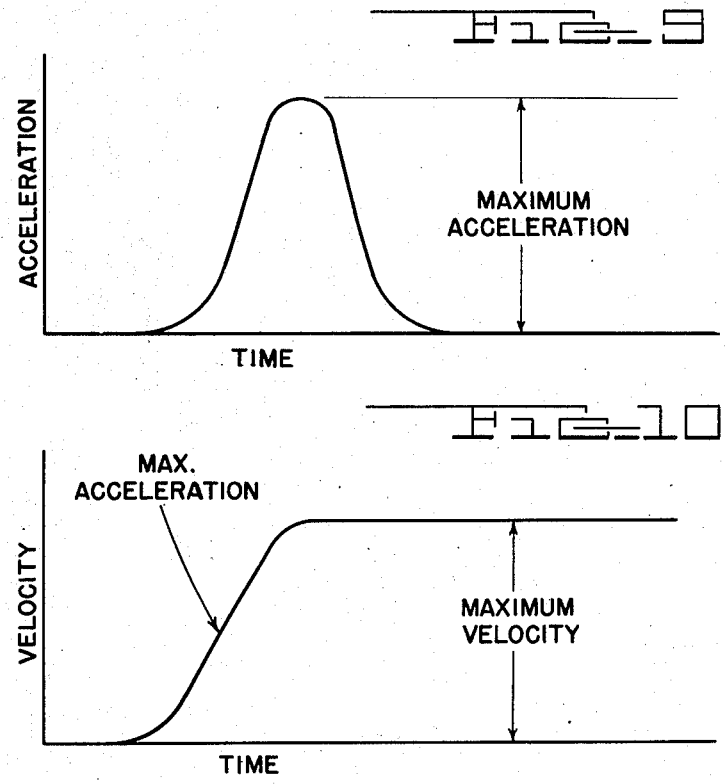
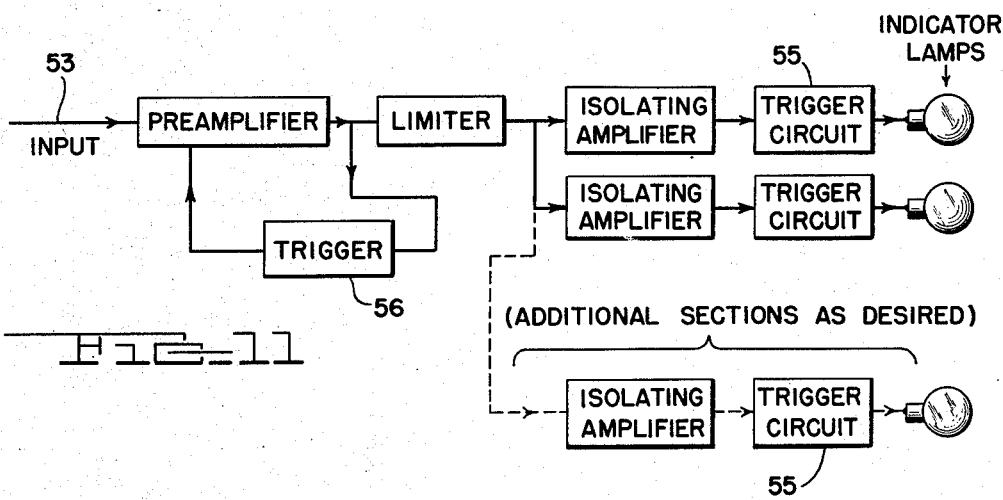
INVENTOR.
JOHN M. McCORMICK
BY Archworth Martin
ATTORNEY Patented Aug. 8, 1950

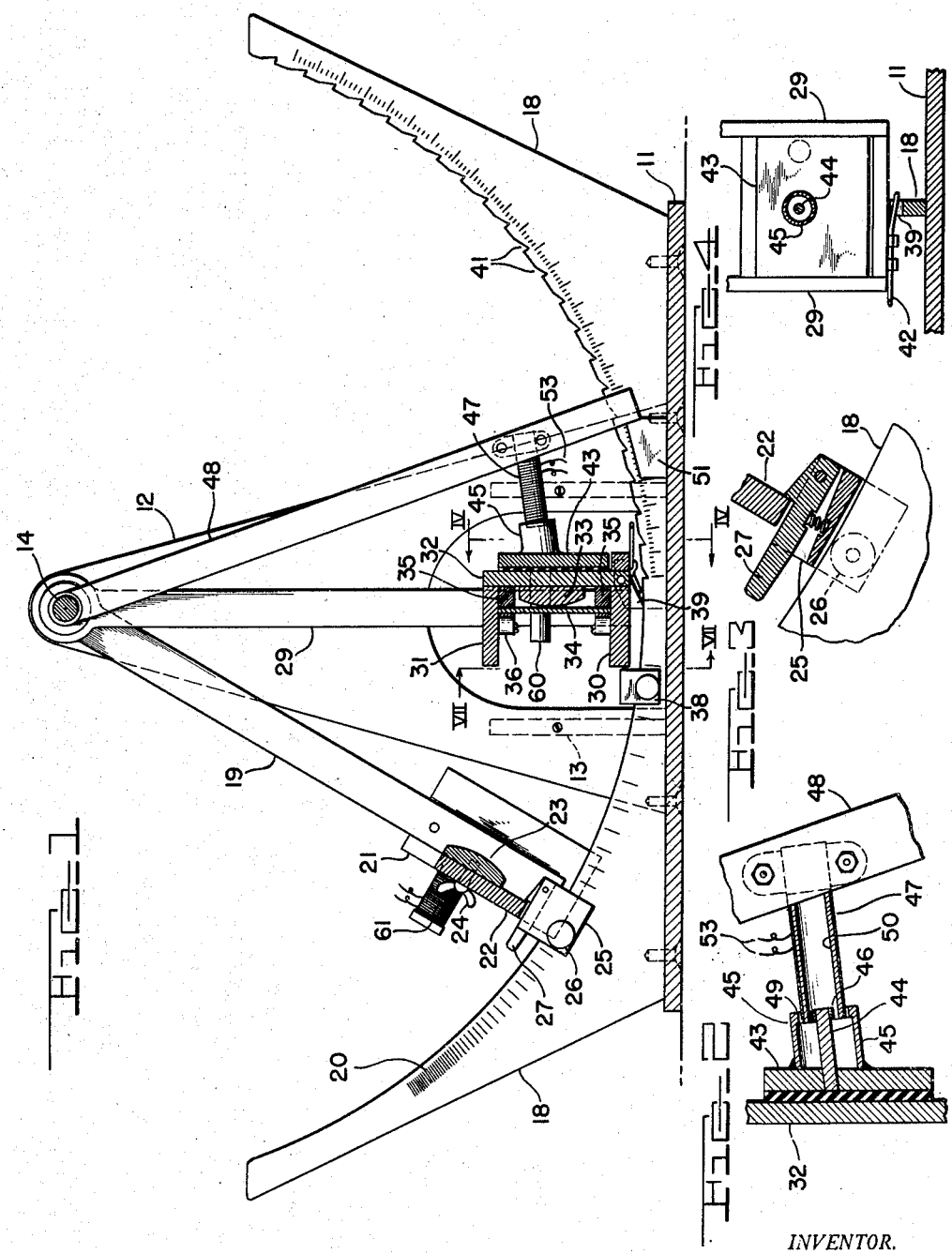

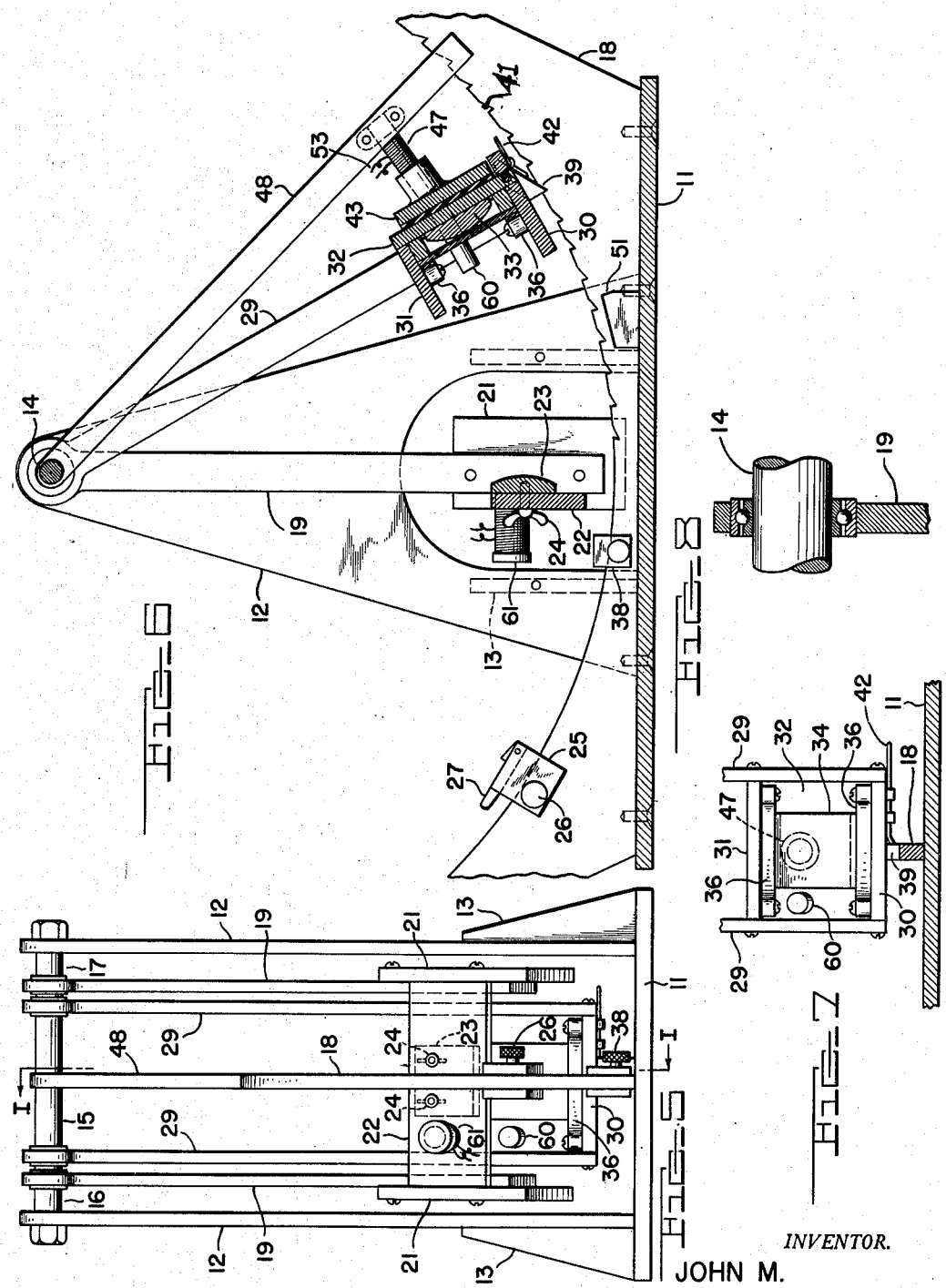

2,518,350

UNITED STATES PATENT OFFICE 2,518,350

TESTING OF MATERIALS BY IMPACT

John M. McCormick, Butler, Pa., assignor to Frank W. Preston, Butler, Pa.

Application December 8, 1948, Serial No. 64,101

6 Claims. (Cl. 73—12)

My invention relates to the testing of materials by impact as is herein shown and applied more particularly to the testing of paper board such as corrugated board used in forming partitions when packing glass bottles and the like into individual cells or compartments in the packing case. However, the invention is useful also in the testing of various other articles such as glass bottles.

Heretofore-practiced methods of impact testing do not give a satisfactory measure of cushioning power since they normally measure only the total amount of energy absorbed by the test piece; this energy frequently, indeed typically, destroys or ruins the test piece. Further this energy may be the same whether it is compounded of a modest force exerted over a long distance (as it would be in a rubber cushion) or by a great force exerted over a short distance (as in a steel bulkhead). Either may absorb a given energy, but for cushioning purposes the former is superior.

A more useful test of the character of a material and its capacity to withstand shocks or to function as a cushioning element is to take a measure of the force exerted during the impact imposed upon the test piece, rather than the energy transferred to the sample or test piece by a blow thereon.

One object of my invention is to provide a testing device and method of the character referred to wherein a reading or indication is secured at the point in which a suspended test piece attains its maximum acceleration after an impact of known energy has been applied thereto.

Another object of my invention is to provide apparatus and a method whereby successive readings can be had of the movement of the test piece after a blow has been imposed against the same.

Still another object of my invention is to provide a means and a method whereby repeated impacts can be applied against a given test piece and successive readings readily secured with respect to the force exerted on the test piece during each blow.

In the accompanying drawings, Figure 1 is a view of the apparatus taken on the line I—I of Fig. 5; Fig. 2 is an enlarged sectional view of one of the solenoid devices of Fig. 1; Fig. 3 is an enlarged sectional view of one of the latch devices of Fig. 1; Fig. 4 is a view taken on the line IV—IV of Fig. 1; Fig. 5 is a rear end view of the apparatus; Fig. 6 is a view similar to that of Fig. 1, but showing certain of the parts in other positions; Fig. 7 is a view taken on the line VII—VII of Fig. 1; Fig. 8 is an enlarged sectional view of one of the bearings on the pendulum supporting shaft; Fig. 9 is a diagrammatic view showing an accelerating curve of the test piece and its pendulum after a blow has been imparted to the test piece, as recorded by an oscilloscope; Fig. 10 is a curve showing the acceleration of a test piece tested according to my invention, and Fig. 11 is a diagrammatic view showing the manner in which the movements of the test piece and its pendulum may be visually shown as respects acceleration at various points in its path of movement.

The apparatus comprises a base plate 11 upon which are mounted uprights 12 in the form of triangular side plates and brace plates 13, all of which comprise the framework of the apparatus. A shaft 14 having spacer sleeves 15—16 and 17 is supported in the upper ends of the side plates 12. A track bar 18 is rigidly secured to the base plate 11.

A pair of pendulum hangers 19 are supported at their upper ends by the outer races of ball bearing assemblies that are, in turn, carried by the shaft 14 in the manner shown more clearly in Fig. 8. Scale marks 20 are indicative of the energy which will be produced by the pendulum when released at certain points along this ascending scale. Near their lower ends, the hanger bars 19 carry plates 21 that are connected by a cross bar 22 to which is detachably connected a platen or impact member 23 by bolts and wing nuts 24. The plates 21 extend somewhat forwardly of the arms 19 in order to place the center of gravity in the axial line of the pendulum bars 19.

A block 25 is adjustably positioned along the track 18 by a knurl-headed screw 26 and carries a latch 27 which is pivotally mounted for engagement with and disengagement from the cross bar 22 of the pendulum 19, so that the pendulum can be released at any set height, depending upon the energy with which it is desired to strike a test specimen.

A second pair of pendulum bars 29 are hung from ball bearings that are carried by the shaft 14. These bars 29 carry a connecting and supporting plate 30 at their lower end, and a second plate 31 connected thereto at a higher plane. These plates 30—31 extend somewhat past the rear edges of the bars 29 to give the desired "balance" or distribution of weight, so that when the bars 19 and 29 are in their released or idle positions, they will be approximately parallel to one another, with their longitudinal axes in a common vertical plane.

A black plate 32 extends across the rear edges of the plates 30 and 31 and carries a platen 33 that serves as a back-up or anvil member for a test piece 34 which, in this case, may suitably be of corrugated board or cardboard. The test piece is held against the seat bars 35 by leaf springs 36 whose ends are respectively connected to the plates 30 and 31 by suitable screws as shown more clearly in Figs. 1 and 7.

The bars 19 and 29 are preferably of light weight and can suitably be of aluminum, while the various plates 21—22 and the members 31—32 which, in effect, function as pendulum bobs are preferably of heavier material such as steel, in order to give centers of gravity at points near the lower ends of the pendulum bars. Also the impacting platen 23 and the specimen supporting platen 33 are set well up on their respective supporting plates in order that the center lines of the platens, when they are in horizontal alinement with one another, will pass through the center of percussion of the pendulums, thus minimizing the bending torque on the arms and the resulting flexural vibrations. Also when the pendulum arms 19 and 29 are at rest—in their vertical positions—the platens 23 and 33 will be spaced apart a distance equal to the thickness of the specimen to be tested. These platens are removable to permit the use of other platens of various sizes and shapes, according to the character of the specimen to be tested. A stop 38 for the pendulum member 30 is adjustably secured to the track 18 to insure that in case of unbalanced weight on the hanger bars 29, the lower ends of the bars and the platen 33 will not hang at a point rearwardly of a vertical line drawn from the center of the shaft 14.

The pendulum bar 32 has a latch 39 pivotally mounted thereon which is weighted so that it will have gravity engagement with teeth or notches 41 in the bar 18, a thumb-actuated lifting lever 42 being pivotally mounted on the bar in order to raise the latch 39 and permit the pendulum to return from the position shown in Fig. 6.

A base piece 43 is secured to the cross bar 32 and carries a permanent magnet 44. A cylindrical sleeve 45 is welded to the base piece 43, the sleeve and the magnet being tilted somewhat on their axis as shown in Fig. 1, in order that there can be closer approximation of a co-axial straight line movement with the solenoid hereinafter described. A small ring 46 of iron snugly encircles the outer end of the magnet 44, and the sleeve 45 is flanged inwardly slightly at its outer end at 49, in order to provide a small air gap and a concentrated magnetic field.

A solenoid 47 is secured to a hanger bar 48 that is hung from the shaft 14, on a ball bearing, as shown more clearly in Fig. 8. This solenoid contains many turns of insulated copper wire, in several layers on an insulated non-magnetic tubular core 50, the solenoid being so positioned on its hanger 48 that it can move freely into and out of the magnet assembly. A stop 51 is provided at the side of the track 18 to limit the downward or backward movement of the hanger 48 to a point at which the solenoid 47 will be just entering the sleeve 45. The impact of forward movements of the pendulum bars 19 and their platen 23 against the test specimen 34 will swing the hangers 29 and the permanent magnet toward the hanger bar 48, thus inducing flow of current in the solenoid turns, the duration of current flow being dependent upon the time required for the tubular core 50 of the solenoid to strike the base piece 43, and dependent upon the velocity of the pendulum bob members carried by the hanger bars 29. The latch 39 and the notches 41 serve as a convenient means for determining how far the pendulum bars 29 have been swung under the force of an impact, but this constitutes a minor feature of my invention.

When the solenoid coil is connected to a registering instrument or circuit, such as an oscilloscope, it may be utilized to produce a visible pattern such as that shown in Fig. 10. While this gives a measure of the maximum velocity, such velocity is not the critical consideration. What I wish to observe is the acceleration (the rate of change of velocity or slope of the velocity-time curve). The acceleration may be displayed as a visible pattern by connecting the solenoid coil through a differentiating circuit to the oscilloscope, yielding a pattern as illustrated by Fig. 9. By such a display, the maximum acceleration is clearly demonstrated. While a given amount of energy can be transferred or transmitted either by a sharp hard impact or by an impact of less intensity which persists for a long time, a better measurement of the force and its effect on test pieces is secured where the maximum acceleration is measured as in the present instance. Since the mass of the pendulum is constant and since by the laws of physics the force acting is proportioned to the product of the mass and the acceleration, then the acceleration is a measure of the force.

The peak force during an impact has been found to differ widely with different cushions and between successive like impacts against the same cushion (as its structure breaks down). The device therefore provides a useful tool for studying behavior, under impact, of cushioning material.

It will be observed in Figs. 9 and 10 that the acceleration is quite rapid. Fig. 10 shows a typical curve that would be produced where the solenoid is connected to an oscilloscope, while the curve in Fig. 9 is typical of a curve produced when a differentiating circuit is introduced into the connection between the solenoid and the oscilloscope. If it is desired to indicate only the maximum or peak acceleration, a circuit such as Fig. 11 will be used.

In Fig. 11, the input line 53 leads from the coil 47 to the amplyfing and signal or recording circuits. The preamplifier amplifies and differentiates the imput signal with principal pulse negative. Each of the isolating amplifiers further amplifies the signal and reverses the polarity.

All of the trigger circuits are essentially similar except for the bias voltage applied to them. They are so arranged that they are inactive until the signal voltage applied to them exceeds a certain positive threshold value determined by the bias voltage referred to above. When the threshold value is reached, the trigger functions applying power to its indicator lamp. Once tripped, the trigger remains tripped until reset manually. A multiplicity of such trigger circuits is provided, each set to have a slightly higher threshold value than the preceding one. When a signal is applied, the number of trigger circuits tripped, as revealed by the number of indicators lighted, is a measure of the maximum height of the input peak. Each trigger circuit 55 is provided with an isolating amplifier which prevents the disturbance caused by the operation of one trigger from interfering with another.

An additional similar trigger circuit 56 is provided which takes its input from the output of the preamplifier. At that point, the signal is inverted (reversed in polarity). The main signal pulse we wish to measure is here negative and any reverse pulses in the signal are positive. This additional trigger circuit is set to operate on small positive pulses (reversed in polarity from the pulse being measured) and is so arranged that once it trips, it causes the preamplifier to cease to function. Thus the principal input pulse passes through and is measured. The first reversed pulse (which always follows the principal one) causes the preamplifier to be shut down, blocking out any subsequent stray signals which might give spurious indications.

When corrugated board is used as a test piece, for example, the first impacts by the platen 22 will find the board rather soft or yieldable and therefore the rate of acceleration of the pendulum 29 will be small, so that perhaps only the uppermost one of the indicator lamps (Fig. 11) will be illuminated. On succeeding impacts, as the corrugated board becomes flattened and more resistant, the acceleration will become greater, until perhaps all of the lamps are illuminated.

In the testing of hard materials such as glass bottles, the device will be useful because it will register the rate of acceleration and hence the amount of force produced by the impact of the platen 23 and thus the resistance of the test piece to breakage. Platens of various contours other than semi-cylindrical shapes will be substituted for 23 and 33 when desired.

My apparatus provides also for measuring the relative velocity of the pendulums that respectively carry the impact platen 23 and the test piece. The measure of this relative velocity can be integrated, giving the amount of crushing that the test piece undergoes and may be displayed on an oscilloscope simultaneously with the reading produced by the magnet 44 and the coil 47, thus giving a simultaneous measurement of both the force on the cushion and its distortion.

This measure of relative velocity is secured by a permanent magnet 60 that is carried by the plate 32, on the pendulum bars 29. A solenoid 61 having a tubular core is carried by the cross bar 22 of the pendulum hangers 19 and will telescope with the magnet 60 when the pendulum bars 19 are released from the position shown in Fig. 1. As the coil 61 and the magnet 60 make telescopic engagement with each other, a current flow will be set up in the coil which is connected to an oscilloscope or other electrical or measuring instrument.

I claim as my invention:

1. Apparatus for testing by impacts, comprising means for moving an impact member with a predetermined energy against a test piece, a member for supporting the test piece and having a known inertial resistance to movements under impacts applied to one side thereof, means for visually showing the course of acceleration of the test piece during movement thereof after impact thereon, the last-named means comprising a solenoid coil mounted in proximity to the path of movement of the second-named member, and a magnetized element carried by the second-named member, for movement into telescopic relation with the coil through movement of the second-named member upon engagement of the impact member with the test piece, to thereby produce electrical current in the coil, and an indicating device that is energized by said current.

2. Apparatus for testing by impacts, comprising means for moving an impact member with a predetermined energy against a test piece, a member for supporting the test piece and having a known inertial resistance to movements under impacts applied to one side thereof, means for visually showing the course of acceleration of the test piece during movement thereof after impact thereon, the last-named means comprising a solenoid coil mounted in proximity to the path of movement of the second-named member, and a magnetized element carried by the second-named member, for movement into telescopic relation with the coil through movement of the second-named member upon engagement of the impact member with the test piece, to thereby produce electrical current in the coil, and a plurality of indicating devices that are successively energized by said current.

3. Apparatus for testing by impacts, comprising a pendulum having means thereon for supporting a test piece, a second pendulum movable toward the first member thereon in position to engage the test piece when the second-named pendulum is swung into proximity to the first-named pendulum, a hanger bar pivotally supported at its upper end, a permanent magnet and a solenoid coil carried by the first-named pendulum and the hanger bar respectively, means for supporting the hanger bar with its lower portion in proximity to the lower portion of the first-named pendulum when the pendulum is in a vertical position, and with the magnet and the coil in partly separated relative positions, the magnet being positioned for movement into telescopic relation with the coil, through movement by the first-named pendulum toward the hanger bar, under a blow by the impact member against the test piece, and an indicating device that is energized through said relative telescopic movement of the magnet and the solenoid.

4. Apparatus for testing by impacts, comprising a pendulum having means thereon for supporting a test piece, a second pendulum movable toward the first member thereon in position to engage the test piece when the second-named pendulum is swung into proximity to the first-named pendulum, a hanger bar pivotally supported at its upper end, a permanent magnet and a solenoid coil carried by the first-named pendulum and the hanger bar respectively, means for supporting the hanger bar with its lower portion in proximity to the lower portion of the first-named pendulum when the pendulum is in a vertical position, and with the magnet and the coil in partly separated relative positions, the magnet being positioned for movement into telescopic relation with the coil, through movement by the first-named pendulum toward the hanger bar, under a blow by the impact member against the test piece, and indicating devices that are successively energized during said telescopic movement.

5. Apparatus for testing by impacts, comprising a pendulum having an impact member thereon, a second pendulum having means thereon for supporting a test piece in position to be engaged by the impact member upon swinging movement of the first-named pendulum toward the second pendulum, and a permanent magnet and a solenoid coil respectively mounted on said pendulums in position to have telescopic movement with respect to each other, when the first-named pendulum is swung toward the other pendulum and the impact member approaches the test piece.

6. Apparatus for measuring velocity, comprising a pendulum member and another pendulum-like member supported for swinging movement, a magnetized element and a solenoid coil respectively mounted on said members in position to have telescopic movement with respect to each other, when one of the members is swung toward abutting engagement with the other member from a point at which the coil and the said element are remote from each other, whereby an electrical current is produced in the coil during the swinging movement, and an indicating device that is energized by said current.

JOHN M. McCORMICK.

REFERENCES CITED

The following references are of record in the file of this patent:

UNITED STATES PATENTS

| Number | Name | Date |
|---|---|---|
| 1,921,833 | McGorum | Aug. 8, 1933 |
| 1,985,478 | Yuasa | Dec. 25, 1934 |
| 2,053,436 | Knowles | Sept. 8, 1936 |
| 2,210,970 | Bonell | Aug. 13, 1940 |
| 2,237,326 | Barry | Apr. 8, 1941 |
| 2,292,549 | Simmons | Aug. 11, 1942 |
| 2,454,793 | Grogan et al. | Nov. 30, 1948 |
| 2,475,614 | Hoppmann et al. | July 12, 1949 |

FOREIGN PATENTS

| Number | Country | Date |
|---|---|---|
| 13,009 1911 | Great Britain | Nov. 30, 1911 |